Dec. 2, 1930.  G. OPITZ  1,783,258
LETTER OF CREDIT FORM
Filed Nov. 14, 1929
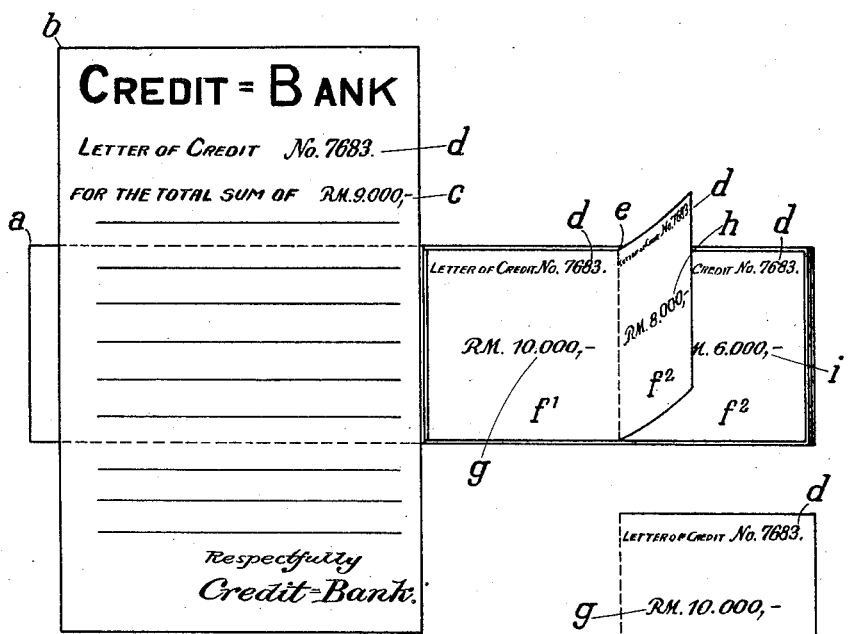
Inventor:
Georg Opitz, Patented Dec. 2, 1930

1,783,258

UNITED STATES PATENT OFFICE

GEORG OPITZ, OF BERLIN, GERMANY

LETTER-OF-CREDIT FORM

Application filed November 14, 1929, Serial No. 407,168, and in Germany September 7, 1928.

In banking-business it is a common practice to issue letters of credit to customers travelling to several towns either in their home country or abroad. Banks are using for this service special forms made of safety-paper provided with a main heading and subsequent printing. Upon a separate page of the letter of credit, generally on the inside, the respective amounts paid-out by the paying banking-institution are noted as having been received by the holder of the letter of credit and the difference between the total amount of the sums thus paid-out and the amount of credit for which the letter of credit was originally issued is the sum which still remains at the disposal of the holder of the letter of credit.

Practice has shown that entries in the letter of credit forms are falsified in spite of safety-paper and safety printing, either by washing with chemicals or by erasing. The object of the present invention is to prevent such falsifications on letters of credit insofar as is possible.

According to the present invention, the letter of credit is to be combined with a block of safety-coupons, whereby each coupon is subdivided into two parts by means of a separating-line, and each part of a coupon is provided with corresponding printing of partial numbers, commencing in sequence from the normal maximum amount and being uniformly reduced downwardly.

Though it is in itself known to provide banking-forms with a block of separable coupons, partial coupons of the block in these known forms directly represent a value-bill, but under no conditions do the safety-coupons of the prior art serve at any time as a control of the remaining value of the letter of credit.

The letter of credit form with echelon check-book, forming the subject of the present invention, is schematically illustrated in the accompanying drawing by way of example, wherein:

Figure 1 is a top-plan of the letter of credit together with the block of safety-coupons connected therewith, Figure 2 illustrates a separated safety-coupon.

The letter of credit is provided with an echelon check-book primarily designed in accordance with the German Patent 469604, December 15, 1928, of applicant. It consists of the main letter of issue from the issuing bank to its correspondents comprising the form $b$; $c$ represents the total amount upon which the letter of credit is issued and $d$ is the number of the letter of credit, which is affixed to the letter of credit proper, as well as to the two halves of the safety-coupons.

The block of safety-coupons may be connected by the cover $a$ with the form $b$. The block of safety-coupons consists of a certain number of sheets, each of which is subdivided by a perforated-line $e$ into two parts $f^1$ and $f^2$. These parts $f^1$ and $f^2$ bear the corresponding imprinted sums in a sequence of standardized maximum amounts, reduced uniformly downwards. The safety coupons are preferably formed of any conventional type of safety paper as now in common use in banks and the like; for instance, a paper which will visibly react to attempted erasures and the like. Furthermore, as already mentioned, the letter of credit number $d$ and the standard maximum sum $g$ are imprinted upon both coupons of the first safety-sheet. On the following safety coupons, in both coupons the partial amounts reduced uniformly downward are printed, together with the number $d$. $h$ and $i$ are such partial amounts. $h$ represents the amount following the maximum sum, while $i$ represents the next subsequent sum.

Figure 2 illustrates the right hand safety-coupon separated by the issuing bank, it having been previously executed and provided with the letter of credit number $d$ and the standardized maximum amount $g$; this safety-coupon must be separated, because its imprinted amount $g$ exceeds the letter of credit sum $c$, and this coupon may be filed with the documents of the bank issuing the letter of credit.

Instead of imprinting the partial amounts, the marking of such amounts may be effected by perforation-marks on the partial coupons, or by different coloured, or different, subsequently imprinted leaves, the various colours or subsequent printing of which represents the different partial amounts, or it may be effected by means of other marks having the same characterizing effect.

The described formation of the safety-sheets and of their sequential relation enables the employment of the following echelon-control. Upon issuing the letter of credit, the safety-sheets are separated by the issuing bank and upon payment of letter of credit amounts by the paying-out banking-institution, the one half of the safety-sheet which is cashed is separated from the safety-sheets, the printed amount of which exceeds the remaining unpaid amount of the letter of credit.

In this way it is enabled that the unpaid balance of the credit-amount is less than the sum entered upon the stock of the last separated coupon of the safety-sheet and at the same time is larger than the sum to be perceived from the following not yet separated double-part safety-sheets.

The banking-institution to which a letter of credit is presented for payment, can therefore check by one glance upon the first, not yet separated safety-sheet and the stock of the previous, separated coupon of the safety-sheet, whether the not yet paid-out sum of the letter of credit is, as it always should be, ranging between the two amounts imprinted upon the stock or stub in question and the following safety-sheet. The paying institution need then correctly figure that there is but a remote contingency of a fraudulent change in the letter of credit having taken place within the range of the two stubs in question. If the person committing fraud intends to deceive to a larger amount, this endeavour is counteracted by the proper employment of the echelon-control, whereby the described bodily development of the safety-coupons has been enabled.

If therefore in the above mentioned example a letter of credit is issued to an amount of RM. 9000, the issuing bank will (see Fig. 2) separate the coupon $f^2$ of the first safety-sheet. Then if the holder of the letter of credit is receiving RM. 2000 at any banking-institution, the paying bank will separate the coupon $f^2$ of the second safety-sheet and any chemical washing-out of this RM. 2000 which may have been entered upon the letter of credit, would be discovered by the following banking-institution applied to for a payment, after one glance at the echelon-control, even if the chemical washing could not otherwise be seen.

If all safety-coupons have been used by separating the one part of the same, this indicates to the banking-house to which the letter of credit is presented, that of the original amount of the letter of credit only such sum is still owing, which is less than that printed upon the last stock.

The separated coupons can be used by the bank issuing the letter of credit, or their reimbursers as a check in such manner that remittance of the separated coupons by the paying-out banks to the bank issuing the letter of credit is made imperative. The safety-sheets may also be used for book-entries and may be correspondingly imprinted.

The echelon check-book may be combined with the letter of credit form in a single book or it may be issued separately. It must however be shown that the echelon check-book and letter of credit belong together.

The safety control-sheets if desired may be connected with the letter of credit form paper, to form a single sheet. The arrangement in such case however must be such that the separation of a coupon and retention of the stock belonging thereto is possible.

I claim:

1. A letter-of-credit book of safety-coupons comprising a folder, a plurality of safety-coupons arranged therein, and formed of safety-paper, each coupon being perforated thereacross, thus dividing each coupon into two portions, and each coupon having a value denomination thereon in diminishing sequence from coupon to coupon, the difference in value from one coupon to another designating the maximum and minimum limits of the remaining value of the book, the said value denomination occurring twice on each coupon, once on each side of the perforations, whereby upon detachment of one portion of the particular coupon representing the next higher printed value than the remaining maximum value of the letter-of-credit book there will be left remaining a corresponding stub, and the original total and remaining partial value of the letter-of-credit book can be determined.

2. A letter-of-credit book of safety-coupons comprising a folder, a plurality of safety-coupons arranged therein and formed of safety-paper, each safety-coupon being perforated thereacross thus dividing each safety-coupon into two portions, each safety-coupon having the same serial number thereon, occurring once on each side of the perforations, and each safety-coupon having a value denomination thereon in diminishing sequence from safety-coupon to safety-coupon, the difference in value from one safety-coupon to another designating the maximum and minimum limits of the remaining value of the book, the said value denomination occurring twice on each safety-coupon, once on each side of the perforations, whereby upon detachment of one portion of the particular safety-coupon representing the next higher printed value than the remaining maximum value of the letter-of-credit book there will be left remaining a corresponding stub, and the original total and the remaining partial value of the letter-of-credit book can be determined.

3. A letter-of-credit book of safety-coupons comprising a folder, a plurality of safety-coupons arranged therein and formed of safety-paper, each safety-coupon being perforated transversely thereacross, thus dividing each safety-coupon into two portions each safety-coupon having the same serial number thereon occurring once on each side of the perforations, and each safety-coupon having a value denomination thereon in diminishing sequence from safety-coupon to safety-coupon, the difference in value from one safety-coupon to another designating the maximum and minimum limits of the remaining value of the book, the said value denomination occurring twice on each safety-coupon, once on each side of the perforation, whereby upon detachment of one portion of the particular safety-coupon representing the next higher printed value than the remaining maximum value of the letter-of-credit book, there will be left remaining a corresponding stub, and the original total and remaining partial value of the letter-of-credit book can be determined.

In testimony whereof I affix my signature.

GEORG OPITZ.